United States Patent
Cagle

(10) Patent No.: US 10,072,168 B2
(45) Date of Patent: Sep. 11, 2018

(54) MARKING FLUIDS FOR VINYL SUBSTRATES

(75) Inventor: Phillip C. Cagle, San Marcos, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 1288 days.

(21) Appl. No.: 11/249,606

(22) Filed: Oct. 13, 2005

(65) Prior Publication Data

US 2007/0084380 A1   Apr. 19, 2007

(51) Int. Cl.
*C09D 11/322* (2014.01)

(52) U.S. Cl.
CPC .................. *C09D 11/322* (2013.01)

(58) Field of Classification Search
CPC ............... C09D 11/00; C09D 11/30
USPC ............................. 106/31.6, 31.86
See application file for complete search history.

(56) References Cited

U.S. PATENT DOCUMENTS

| | | | | |
|---|---|---|---|---|
| 4,148,944 A * | 4/1979 | Ruhf | ................ | C09D 11/106 427/256 |
| 4,892,775 A | 1/1990 | Song | | |
| 5,221,334 A | 6/1993 | Ma et al. | | |
| 6,087,416 A | 7/2000 | Pearlstine et al. | | |
| 6,180,691 B1 * | 1/2001 | Cheng | ................ | C08F 220/18 523/160 |
| 6,764,173 B2 | 7/2004 | Chen et al. | | |
| 6,773,102 B2 | 8/2004 | Chen et al. | | |
| 6,848,777 B2 | 2/2005 | Chen et al. | | |
| 2003/0150355 A1 * | 8/2003 | Choy | ................ | C09D 11/36 106/31.57 |
| 2003/0213402 A1 | 11/2003 | Magdassi et al. | | |
| 2004/0061755 A1 | 4/2004 | Chen et al. | | |
| 2004/0189762 A1 | 9/2004 | Chen et al. | | |
| 2005/0119368 A1 * | 6/2005 | Hall-Goulle | ........... | B41M 3/144 523/160 |
| 2005/0137282 A1 * | 6/2005 | Cagle | ................ | C09D 11/30 523/160 |
| 2005/0176847 A1 | 8/2005 | Cagle | | |
| 2006/0007287 A1 * | 1/2006 | Cagle | ................ | C09D 11/30 347/100 |

FOREIGN PATENT DOCUMENTS

| | | |
|---|---|---|
| EP | 0 974 626 A1 | 1/2000 |
| EP | 1 088 866 A1 | 4/2001 |
| WO | WO 2004/072134 A | 8/2004 |

* cited by examiner

*Primary Examiner* — Veronica F Faison
(74) *Attorney, Agent, or Firm* — Dierker & Kavanaugh PC

(57) ABSTRACT

Marking fluids and apparatus for marking vinyl substrates, such as through inkjet printing, use aqueous-based fluid vehicles having an amount of a vinyl-softening co-solvent sufficient to cause swelling of the vinyl substrate after water has been driven from the marking fluid.

12 Claims, 4 Drawing Sheets

Vinyl Softening
○ none
□ none or very slight
△ slight mark
◇ softens
+ dissolves

MARKING FLUIDS FOR VINYL SUBSTRATES

BACKGROUND

Aqueous inkjet inks for vinyl printing require heated drying in order to remove volatile vehicle components. In most aqueous inks, the largest component is water, which is relatively easy to remove with heat due to its low boiling point (100° C.). More troublesome are glycols and other humectant solvents with high boiling points (>200° C.). While some of these components can be volatilized and removed with heat, many others cannot. Those that can be removed with heat often dry very slowly, and require high heat levels and long heating times for complete removal. Because of the slow kinetics, drying must continue long after deposition of the ink, which slows the potential throughput of the printer. High heat levels can also damage the substrate, and may create a potential hazard.

The drying process is also important because most common inkjet ink humectants have an adverse effect on the mechanical properties of the dried ink film. Scratch resistance, adhesion, and wet and dry scuff resistance can be significantly impacted by the presence of residual co-solvents. In extreme cases, the ink film never dries, and is easily wiped off the vinyl. Humectant co-solvents, however, are generally required in inkjet inks to minimize nozzle clogging that occurs when evaporation dries out the nozzles, a result known in the art as decap. Without such co-solvents, useful life of inkjet pens would be significantly shortened.

DETAILED DESCRIPTION

Figure 1A:
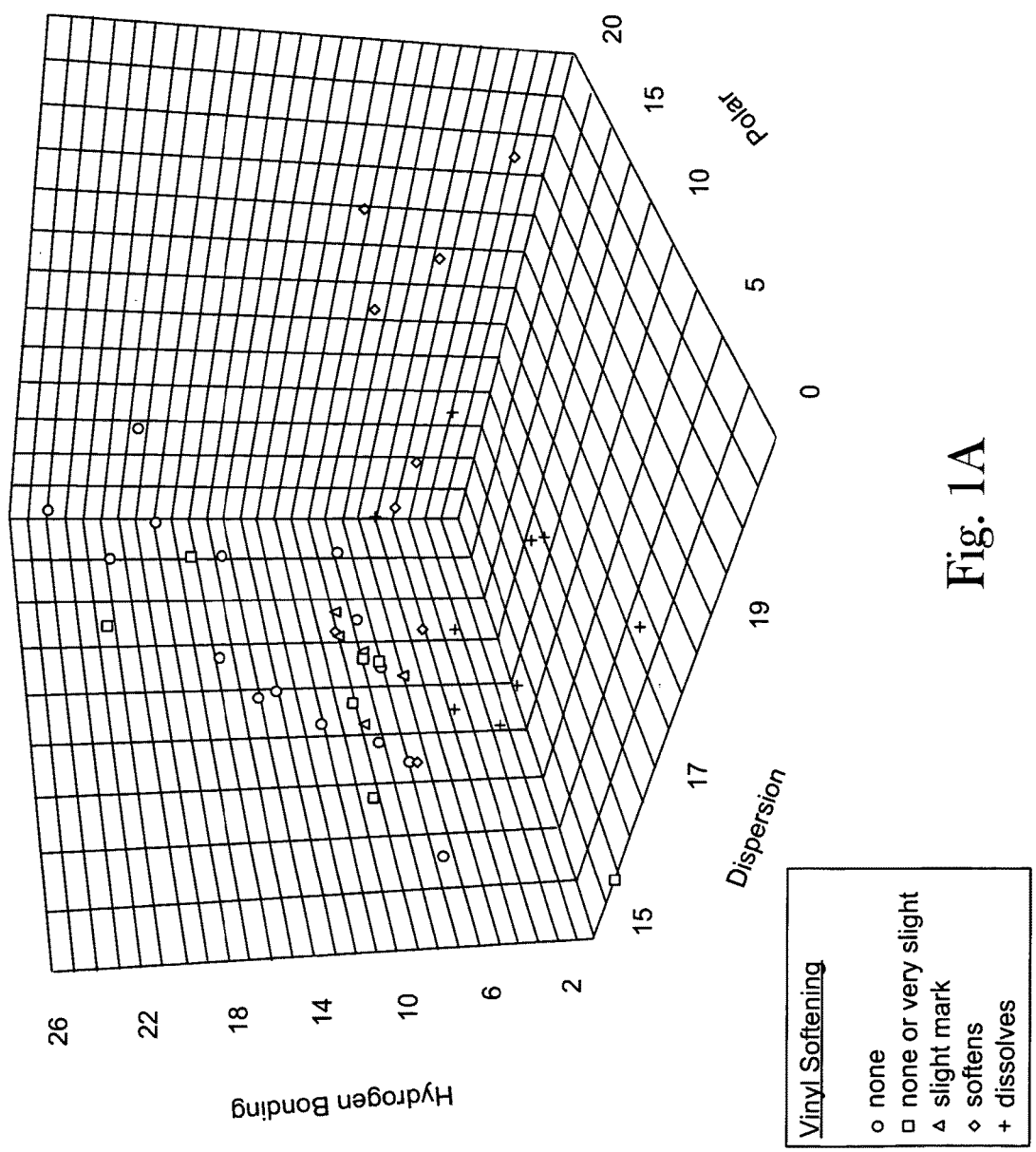
FIG. 1A is an XYZ scatter plot of softening data as a function of Hansen partial solubility parameters for a variety of solvents used to map out suitable solvents for embodiments of the disclosure.

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, chemical or mechanical changes may be made without departing from the scope of the present disclosure. The following detailed description is, therefore, not to be taken in a limiting sense, and the scope of the present disclosure is defined by the appended claims and equivalents thereof.

The various embodiments involve marking fluids for marking vinyl substrates, such as through inkjet printing. Typical marking fluids are aqueous based, having water as a major constituent. However, a variety of different agents are also generally present, such as surfactants, binders, co-solvents, buffers, biocides, sequestering agents, viscosity modifiers, and water. The various embodiments aid both drying of the marking fluid and bonding of the pigment to the vinyl substrate by softening or swelling a surface of the vinyl substrate, thus adsorbing a portion of the marking fluid vehicle and allowing the pigment to adhere to the surface.

For the various embodiments, the marking fluid contains one or more particulate dispersible colorants or pigments that can be suspended or dispersed in the liquid vehicle. Pigments may include surfactant-dispersed, surface-treated or polymer-attached pigments. Polymer-attached pigments include pigments having a polymer covalently attached to the surface of the pigment, a polymer adsorbed or grafted onto the surface of the pigment, or a pigment at least partially encapsulated by a polymer. Such surface treatments or polymer-attachments can aid the pigment in becoming and/or substantially remaining dispersed in a liquid vehicle. Adhesion and rub resistance is provided either by the polymer attachment, or by added polymeric binders. The polymeric binders may be either soluble in the ink vehicle or dispersed as particulates. One example embodiment is the use of an acrylic latex binder.

For the various embodiments, the marking fluid vehicle further contains at least one co-solvent that is at least partially miscible with water, is less volatile than water and is capable of softening vinyl. The various embodiments include such co-solvents in a quantity sufficient to remain on a vinyl substrate after water from the marking fluid is driven off during drying. The quantity remaining is efficacious for softening the vinyl substrate. The softening, or swelling, of the vinyl substrate facilitates adhesion of the pigment and/or binder of the marking fluid.

A variety of solvents are identified herein that dry quickly when applied to heated vinyl films. However, these solvents do not evaporate immediately, but rather swell and penetrate into the vinyl film. Such solvents can be combined with other classical marking fluid formulation components to produce a jettable marking fluid. After marking fluid application, once the water is removed, the remaining marking fluid vehicle acts as a solvent for the vinyl film. The residual solvents in the marking fluid soften and penetrate into the vinyl, which allows the marking fluid to dry much faster than is allowed by simple solvent evaporation alone. The residual solvents may become trapped in a matrix composed of the vinyl film components and any pigment/binder polymer in the marking fluid. By using this technique, small amounts of non-volatile ink vehicle components (such as LEG-1) can be incorporated into a marking fluid without significant deterioration or durability properties.

In screening candidates for embodiments of this disclosure, neat solvents were tested on Flexcon Busmark calendared vinyl for softening power at either RT or 80° C. Three drops of neat solvent were added to the vinyl surface, and covered to avoid evaporation. For the 80° C. testing, the vinyl was heated on a hot plate. After 3 minutes, the vinyl was checked for interaction with the solvent. This scenario was intended to simulate the environment that might be obtained after water evaporation from a marking fluid containing such solvents.

Solvents were separated into 5 subjective grades: 1=no observable mark or swelling of the vinyl; 2=no mark or v. slight mark; 3=slight mark; 4=visible softening and marking of the vinyl; and 5=extensive softening or dissolving of the vinyl film. Tables 1A and 1B are representative of physical parameters and results of the samples tested.

TABLE 1A

Solvent - Physical Parameters

| Solvent | Dispersion (MPa$^{0.5}$) | Polar (MPa$^{0.5}$) | H-Bonding (MPa$^{0.5}$) | Molar Volume |
|---|---|---|---|---|
| hexylene glycol | 15.7 | 8.4 | 17.8 | 123 |
| triethylene glycol monoethyl ether | 16 | 6.8 | 10.6 | |
| Dowanol PnB | 15.3 | 4.5 | 9.2 | 132 |
| Dowanol TPnB | 14.8 | 1.7 | 7.9 | |
| propylene glycol monopropyl ether | 15.8 | 7 | 9.2 | 130.3 |
| ethylene glycol phenyl ether | 17.8 | 5.7 | 14.3 | 124.7 |
| 2-propanol | 15.8 | 6.1 | 16.4 | 76.8 |
| 1-butanol | 16 | 5.7 | 15.8 | 91.5 |
| 1-pentanol | 15.9 | 4.5 | 13.9 | 108.6 |
| tripropyleneglycol methyl ether | 15.3 | 5.5 | 10.4 | 214 |
| diethylene glycol | 16.6 | 12 | 20.7 | 94.9 |
| propylene glycol | 16.8 | 9.4 | 23.3 | 73.6 |
| ethylene glycol | 17 | 11 | 26 | 55.8 |
| ethanol amine | 17 | 15.5 | 21.2 | 59.8 |
| cyclohexanol | 17.4 | 4.1 | 13.5 | 106 |
| dipropylene glycol | 16.5 | 10.6 | 17.7 | 130.9 |
| diethylene glycol monobutyl ether | 16 | 7 | 10.6 | 170.6 |
| diethylene glycol monopropyl ether | 16 | 7.2 | 11.3 | 153.9 |
| ethylene glycol monobutyl ether | 16 | 5.1 | 12.3 | 131.6 |
| triethylene glycol | 16 | 12.5 | 18.6 | 114 |
| hexane | 14.9 | 0 | 0 | 131.6 |
| methanol | 15.1 | 12.3 | 22.3 | 40.7 |
| propylene glycol butyl ether | 14.9 | 4.2 | 10.7 | |
| triethylene glycol monomethyl ether | 16.2 | 7.6 | 12.5 | 160 |
| Dowanol PnP | 15.8 | 7 | 9.2 | 130.3 |
| Dowanol DPM | 15.5 | 5.7 | 11.2 | 157.4 |
| 4-hydroxy-4-methyl-2-pentanone | 15.8 | 8.2 | 10.8 | 124.2 |
| 2-(2-ethoxyethoxy)ethanol | 16.1 | 9.2 | 12.2 | 130.9 |
| 2-butoxyethyl acetate | 15.3 | 4.5 | 8.8 | 171.2 |
| 2-pyrrolidinone | 19.4 | 17.4 | 11.3 | 76.4 |
| dimethylsulfoxide | 18.4 | 16.4 | 10.2 | 71.3 |
| acetonitrile | 15.3 | 18 | 6.1 | 52.6 |
| acetone | 15.5 | 10.4 | 7 | 74 |
| nitromethane | 15.8 | 18.8 | 5.1 | 54.3 |
| diethylene glycol monomethyl ether | 16.2 | 7.8 | 12.6 | 118 |
| 2-butoxyethylacetate | 15.3 | 4.5 | 8.8 | 171.2 |
| gamma-butyrolactone | 19 | 16.6 | 7.4 | 76.8 |
| propylene carbonate | 20 | 18 | 4.1 | 85 |
| cyclohexanone | 17.8 | 6.3 | 5.1 | 104 |
| N-methylpyrrolidinone | 18 | 12.3 | 7.2 | 96.5 |
| tetrahydrofuran | 16.8 | 5.7 | 8 | 81.7 |
| 1,4-dioxane | 19 | 1.8 | 7.4 | 85.7 |
| toluene | 18 | 1.4 | 2 | 106.8 |
| 5-methyl-2-hexanone | 16 | 5.7 | 4.1 | 142.8 |
| ethyl acetate | 15.8 | 5.3 | 7.2 | 98.5 |
| 4-methyl-2-pentanone | 15.3 | 6.1 | 4.1 | 125.8 |
| N,N-dimethylacetamide | 16.8 | 11.5 | 10.2 | 92.5 |

TABLE 1B

Solvent - Effects on Vinyl

| Solvent | RT Observations | Softening (25° C.) | Softening (80° C.) |
|---|---|---|---|
| hexylene glycol | no mark | 1 | 1 |
| triethylene glycol monoethyl ether | no mark | 1 | |
| Dowanol PnB | no mark | 1 | |
| Dowanol TPnB | no mark | 1 | |
| propylene glycol monopropyl ether | no mark | 1 | 3 |
| ethylene glycol phenyl ether | no mark | 1 | 3 |
| 2-propanol | no mark | 1 | |
| 1-butanol | no mark | 1 | |
| 1-pentanol | no mark | 1 | |
| tripropyleneglycol methyl ether | no mark | 1 | |
| diethylene glycol | no mark | 1 | 1 |
| propylene glycol | no mark | 1 | 1 |
| ethylene glycol | no mark | 1 | 1 |
| ethanol amine | no mark | 1 | |
| cyclohexanol | no mark | 1 | |
| dipropylene glycol | no mark | 1 | |
| diethylene glycol monobutyl ether | no mark or v. slight mark | 2 | 3 |
| diethylene glycol monopropyl ether | no mark or v. slight mark | 2 | 3 |
| ethylene glycol monobutyl ether | no mark or v. slight mark | 2 | |
| triethylene glycol | no mark or v. slight mark | 2 | |
| hexane | no mark or v. slight mark | 2 | |
| methanol | v. sight mark | 2 | |
| propylene glycol butyl ether | v. sight mark | 2 | |
| triethylene glycol monomethyl ether | slight mark | 3 | 3 |
| Dowanol PnP | slight mark | 3 | |
| Dowanol DPM | slight mark | 3 | |

TABLE 1B-continued

Solvent - Effects on Vinyl

| Solvent | RT Observations | Softening (25° C.) | (80° C.) |
|---|---|---|---|
| 4-hydroxy-4-methyl-2-pentanone | slight mark | 3 | |
| 2-(2-ethoxyethoxy)ethanol | slight mark | 3 | |
| 2-butoxyethyl acetate | softens/marks | 4 | 4 |
| 2-pyrrolidinone | softens/marks | 4 | 5 |
| dimethylsulfoxide | softens/marks | 4 | 5 |
| acetonitrile | softens/marks | 4 | |
| acetone | softens/marks | 4 | |
| nitromethane | softens/marks | 4 | |
| diethylene glycol monomethyl ether | softens/marks | 4 | |
| 2-butoxyethylacetate | softens/marks | 4 | |
| gamma-butyrolactone | softens/marks | 4 | |
| propylene carbonate | softens/marks | 4 | |
| cyclohexanone | dissolves | 5 | 5 |
| N-methylpyrrolidinone | dissolves | 5 | 5 |
| tetrahydrofuran | dissolves | 5 | |
| 1,4-dioxane | dissolves | 5 | |
| toluene | dissolves | 5 | |
| 5-methyl-2-hexanone | dissolves | 5 | |
| ethyl acetate | dissolves | 5 | |
| 4-methyl-2-pentanone | dissolves | 5 | |
| N,N-dimethylacetamide | dissolves | 5 | |

Figure 1B:
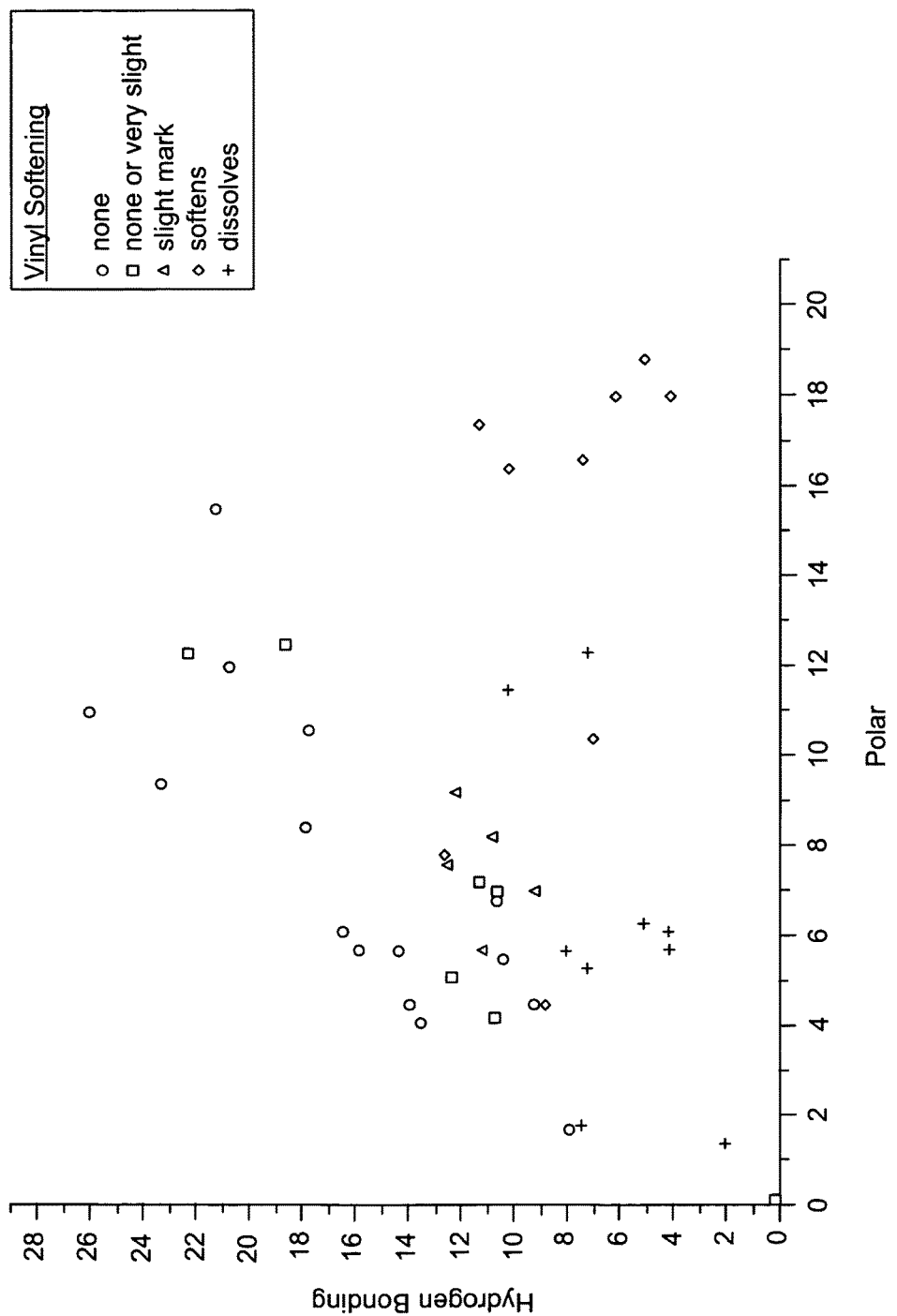
FIG. 1B is an XY projection of softening data as a function of the polar and hydrogen bonding axes of the Hansen partial solubility parameters of FIG. 1.

The amount of subjective vinyl distortion was correlated to the Hansen solubility parameter of each solvent, where the total solubility parameter is separated into partial parameters for dispersion, polar and hydrogen bonding. Hansen solubility parameters and their determination are well documented in the arts and can be found, for example, in "Hansen Solubility Parameters: A User's Handbook," Charles M. Hansen, 2000, CRC Press LLC (Boca Raton), ISBN 0-8493-1525-5. FIG. 1A is an XYZ scatter plot of the softening data for each partial solubility parameter at 25° C., which shows a strong dependence of the softening on the hydrogen bonding parameter. FIG. 1B is an XY projection of the softening as a function of the polar and hydrogen bonding axes. These graphs suggest that a hydrogen bonding parameter less than about 13 $MPa^{0.5}$ acts as a good predictor for vinyl softening. While FIGS. 1A and 1B depict correlation at room temperature solubility parameters, experiments at 80° C. show that the same trends generally hold, but that the softening range may be extended to solvents with slightly higher hydrogen bonding solubility parameters, e.g., about 15-16 $MPa^{0.5}$. Based on the solubility parameter range for vinyl softening and the relative volume of each solvent in a mixture, expected softening of vinyl by solvent mixtures can be estimated from volume fraction averages for each solubility parameter component. For various embodiments, an amount of the solvent mixture is chosen such that a liquid vehicle containing the solvent mixture and water would have a persisting portion of the solvent mixture after driving off the water through evaporation. As a guideline, an amount sufficient to produce a persisting portion of a solvent mixture following evaporation of water content may be a solvent mixture of about 5 wt % or greater of the liquid vehicle. For further embodiments, this persisting portion of the solvent mixture has a Hansen hydrogen bonding solubility parameter of less than about 16 $MPa^{0.5}$.

For some embodiments, the vinyl solvents include glycol ethers and various pyrollidinones. One example is 2-pyrollidinone, which is both a good vinyl solvent and a good humectant, and is sufficiently volatile to be removed with moderate heat (bp 245° C.). For further embodiments, the vinyl solvents have boiling points above 150° C. that show some degree of water solubility. For still further embodiments, such solvents have polar solubility parameters greater than about 3 $MPa^{0.5}$ and hydrogen bonding solubility parameters below about 16 $MPa^{0.5}$. Some examples of solvents for use at elevated temperatures include, but are not limited to, substituted alkyl- and hydroxyalkylpyrrolidones and imidazolidinones, DMSO, sulfolane, ketones, and assorted glycol ethers.

As one example of a marking fluid formulation in accordance with the embodiments, the following composition might be used:
- 15% 2-pyrrolidinone
- 2% PEG-600
- 3% 1,2-hexanediol
- 0.5% Zonyl FSO fluorosurfactant
- 2% pigment dispersion
- 4% acrylic polymer dispersion
- 73.5% water The overall solvent parameter of the combination (after evaporation of the water) is sufficient to allow penetration into the vinyl, and to mitigate the deleterious effects of residual co-solvents on the integrity of the remaining ink film.

As mentioned, in addition to the volatile co-solvent that is present, other additives can also be used to form the liquid vehicle as well, including a mixture of a variety of different agents, such as surfactants, other co-solvents, buffers, biocides, sequestering agents, viscosity modifiers, and water. A typical liquid vehicle may contain from about 5 wt % to 30 wt % of co-solvents in accordance with the embodiments of this disclosure. These vinyl-softening co-solvents can further be used alone, or in combination with non-softening inkjet solvents such that the total solvent power of the solvent blend is sufficient to mark vinyl. Some examples of non-softening solvents may include solvents known in the inkjet art, such as glycols, sugars, polyhydridic alcohols, aliphatic alcohols, aromatic alcohols, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, N-alkyl caprolactams, unsubstituted caprolactams, both substituted and unsubstituted formamides, both substituted and unsubstituted acetamides, and the like.

One or more of many surfactants can also be used in accordance with embodiments of the present invention. Such surfactants may include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, fluoroalkyl polyethylene oxides, substituted amine oxides, and the like. Surfactants are typically utilized in the range from about 0.01 wt % to 10 wt %.

With respect to the co-solvents and surfactants that can be present, selection of such components for use can include an evaluation as to the components' wetting properties. For example, the liquid vehicle can include other co-solvents, humectants, and/or surfactants that act as wetting agents, such as $C_5$ to $C_{22}$ aliphatic hydrocarbons, silicone, fluorocarbon surfactants, or the like. These components can be used to facilitate wetting out low surface energy media such as vinyl.

Consistent with the formulation of this invention, various other additives may be employed to customize the properties of the ink composition for specific applications or performance characteristics. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union Carbide Corp.), Vancide (R.T. Vanderbilt Co.), Proxel (Avecia), and combinations thereof.

Sequestering agents, such as EDTA (ethylene diamine tetraacetic acid), may be included to mitigate deleterious effects of heavy metal impurities, and buffer solutions may be used to control the pH of the ink. From 0 wt % to 2.0 wt %, for example, of such components may be used. Viscosity modifiers and buffers may also be present, as well as other additives known to those skilled in the art to modify properties of the ink as desired. Such additives may typically be present in total at from 0 wt % to 20.0 wt %. Colorants are typically present at from about 0.1 wt % to 10.0 wt %.

With respect to the use of the optional heat source that can be used to assist driving off at least a portion of the water and co-solvent(s) after ejecting the marking fluid onto a substrate, one or more of many known heating devices and associated heating techniques can be used. For example, devices for forced air heating, radiant heating, conductive heating, RF drying, and microwave drying are exemplary of device types that provide acceptable results. The temperature (and air flow with respect to forced air systems) can be modified, depending on the type and/or amount of co-solvent(s) present in the marking fluid composition.

Figure 2:
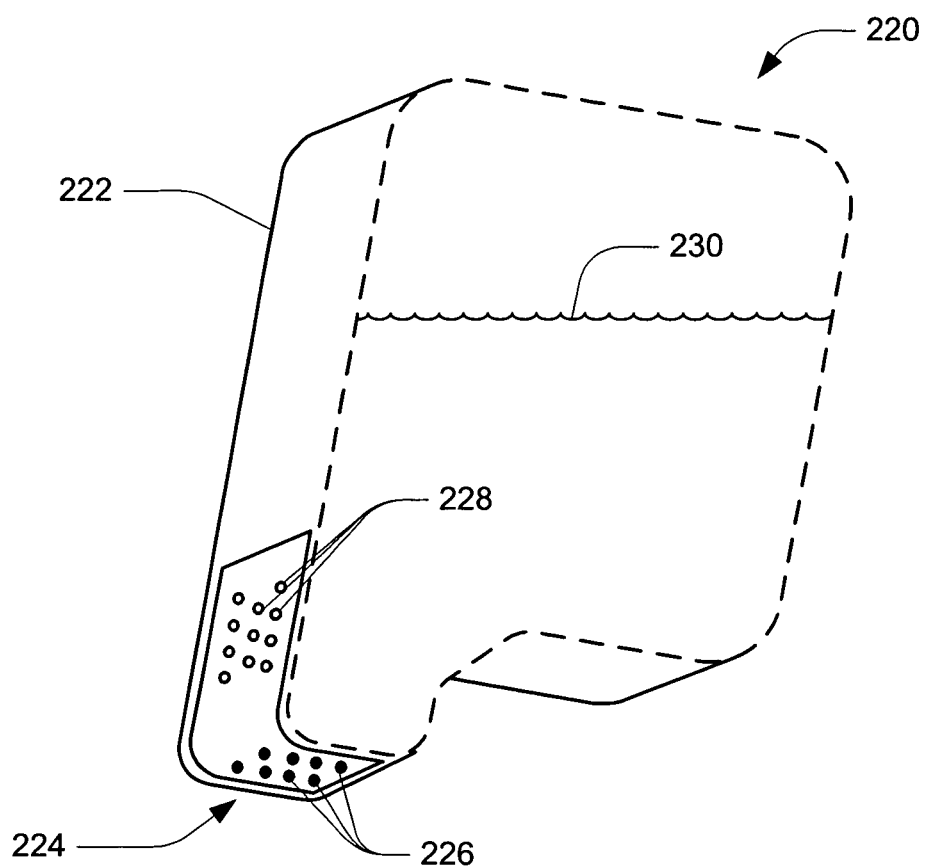
FIG. 2 is a cut-away perspective view of a marking fluid reservoir in accordance with one embodiment of the disclosure.

Marking fluids are typically delivered to a substrate from an ejection device that is either integral with or separate from a reservoir containing the marking fluid. FIG. 2 is a cut-away perspective view of a marking fluid reservoir, or pen, 220 in accordance with one embodiment of the disclosure. The marking fluid reservoir 220 includes a body 222. A fluid ejection device or print head 224 is integral to the body 222. The print head 224 includes marking fluid ejectors 226 for dispensing marking fluid onto a print media or other substrate. The marking fluid ejectors 226 are controlled by various electrical signals received at one or more contacts 228.

The volume within the body 222 is adapted to contain marking fluid 230, e.g., ink. The marking fluid 230 includes a marking fluid vehicle in accordance with an embodiment of the disclosure. The cut-away portion of the body 222 represented by dashed lines may represent the cross-section of a one-color marking fluid reservoir or an individual chamber of a multi-color marking fluid reservoir, with each chamber having a different marking fluid formulation. Thus, the various embodiments include one-color and multi-color marking fluid reservoirs 220.

Figure 3:
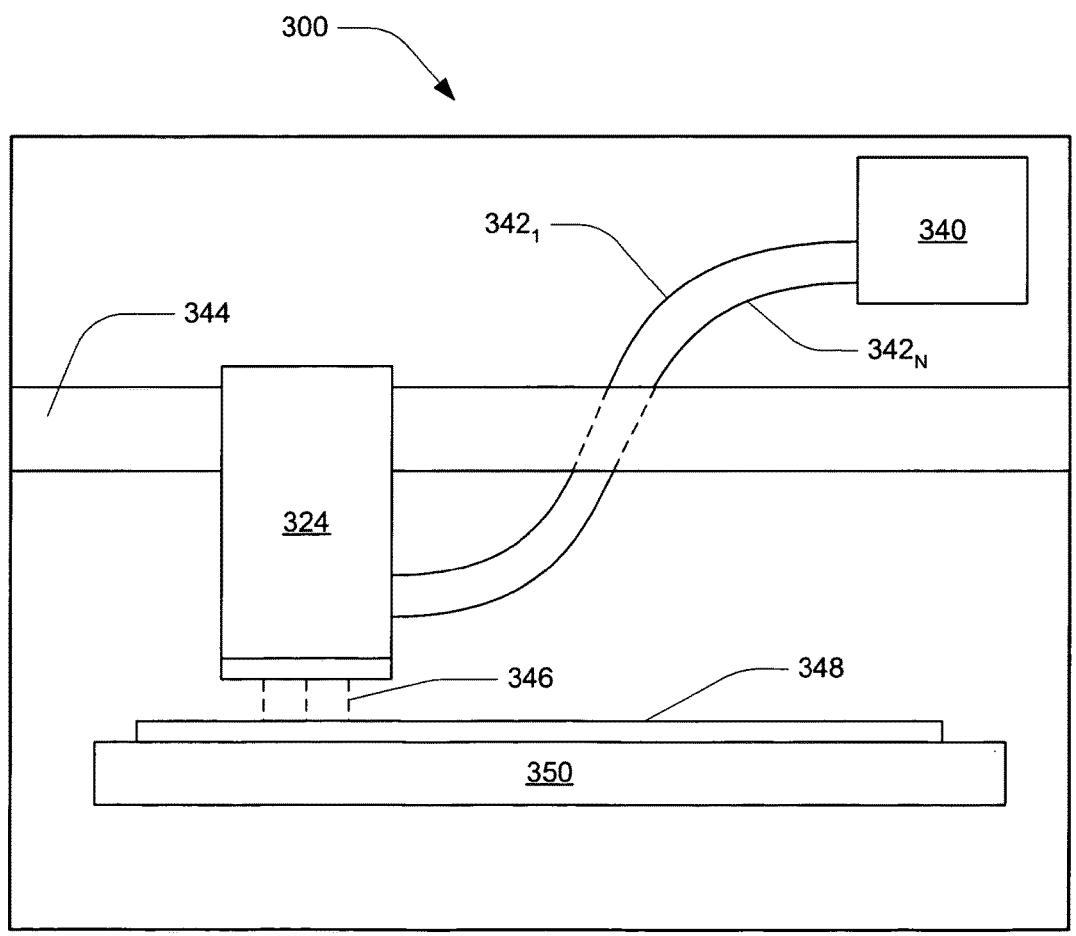
FIG. 3 is a block diagram of an imaging device in accordance with a further embodiment of the disclosure.

While such integrated pens for storage and delivery of marking fluid are common in the consumer market, storage and delivery need not be combined. FIG. 3 illustrates an imaging device 300, such as a printer, according to another embodiment of the disclosure. Imaging device 300 has a fluid handling system that includes a fluid-ejection device 324, such as an inkjet print head, fluidly coupled to a marking fluid reservoir 340, e.g., an ink reservoir, by one or more conduits 342. Fluid-ejection device 324 may be movably attached to a rail or other support 344, allowing it to move relative to the substrate 348. Fluid-ejection device 324 can eject marking fluid droplets 346, such as ink droplets, onto a substrate 348, i.e., vinyl, as fluid-ejection device 324 moves across substrate 348. The marking fluid droplets 346 include a liquid vehicle in accordance with an embodiment of the disclosure. A heat source, such as a heating element 350, may be included to assist in driving off water from the marking fluid delivered to the substrate 348.

For one embodiment, fluid reservoir 340 is fixedly attached to printer 300. For another embodiment, each of conduits 342 conveys a different fluid, e.g., a different colored ink, from fluid reservoir 340 to fluid-ejection device 324. For another embodiment, a portion of conduits 342 are fluid delivery lines that respectively convey different fluids to fluid-ejection device 324 and another portion of conduits 342 are fluid return lines for conveying fluids that are not ejected by fluid-ejection device 324 back to fluid reservoir 340.

What is claimed is:

1. An ink, comprising:
    water;
    a solvent selected from the group consisting of ethylene glycol phenyl ether, diethylene glycol monopropyl ether, ethylene glycol monobutyl ether, 2-(2-ethoxyethoxy)ethanol, and combinations thereof;
    a pigment;
    glycereth-26 (LEG-1); and
    an acrylic latex binder.

2. The ink of claim 1, further comprising a second solvent selected from the group consisting of 2-pyrrolidinone, dimethylsulfoxide,-diethylene glycol monomethyl ether, N-methylpyrrolidone, propylene glycol monopropyl ether, diethylene glycol monobutyl ether, triethylene glycol, triethylene glycol monomethyl ether, propylene glycol n-propyl ether, dipropylene glycol methyl ether, and combinations thereof.

3. The ink of claim 1 wherein the ink includes 4 wt % of the acrylic latex binder.

4. The ink of claim 1 wherein the solvent is present in an amount ranging from about 5 wt % to 30 wt % of the ink.

5. The ink of claim 1 wherein the solvent is present in the ink in an amount sufficient to produce a persisting portion of the solvent after the water is removed, and wherein the amount in the ink is about 5 wt %.

6. The ink of claim 1 wherein the solvent is 2-(2-ethoxyethoxy)ethanol.

7. The ink of claim 1 wherein the solvent is to soften a vinyl substrate upon which the ink is printed when the water is removed.

8. An ink, comprising:
    15 wt % of 2-pyrrolidinone;
    2 wt % of polyethylene glycol (PEG-600);
    0.5 wt % of a fluorosurfactant;
    2 wt % of a pigment dispersion;
    4 wt % of an acrylic polymer dispersion; and
    a balance of water.

9. The ink of claim 8, further comprising 3 wt % of 1,2-hexanediol.

10. A method of printing, the method comprising:
    depositing, via inkjet printing, an ink onto a vinyl substrate, the ink comprising:
        water;
        a solvent selected from the group consisting of ethylene glycol phenyl ether, diethylene glycol monopropyl ether, ethylene glycol monobutyl ether, 2-(2-ethoxyethoxy)ethanol, and combinations thereof;
        a pigment;
        glycereth-26 (LEG-1); and
        an acrylic latex binder; and
    heating the deposited ink to remove water, whereby the solvent softens the vinyl substrate.

11. An inkjet pen, comprising:
    a body;

an ejection device integral to the body; and
an ink enclosed in the body, the ink comprising:
  water;
    a solvent selected from the group consisting of ethylene glycol phenyl ether, diethylene glycol monopropyl ether, ethylene glycol monobutyl ether, 2-(2-ethoxyethoxy)ethanol, and combinations thereof;
    a pigment; and
    an acrylic latex binder.

12. An ink, consisting of:
water;
one or more solvents having a composite Hansen hydrogen bonding partial solubility parameter of about 16 $MPa^{0.5}$ or less;
a surfactant;
a pigment; and
an acrylic polymer dispersed in the ink.

* * * * *